(12) United States Patent
Majer

(10) Patent No.: US 8,181,894 B2
(45) Date of Patent: May 22, 2012

(54) DEVICE FOR GRINDING COFFEE OR OTHER ALIMENTARY SUBSTANCES

(75) Inventor: Luca Doglioni Majer, Carate Urio (IT)

(73) Assignee: Rhea Vendors S.p.A., Caronno Pertusella (VA) (IT)

( * ) Notice: Subject to any disclaimer, the term of this patent is extended or adjusted under 35 U.S.C. 154(b) by 85 days.

(21) Appl. No.: 12/600,278

(22) PCT Filed: May 21, 2008

(86) PCT No.: PCT/IB2008/001264
§ 371 (c)(1),
(2), (4) Date: Nov. 16, 2009

(87) PCT Pub. No.: WO2008/142536
PCT Pub. Date: Nov. 27, 2008

(65) Prior Publication Data
US 2010/0170971 A1 Jul. 8, 2010

(30) Foreign Application Priority Data
May 23, 2007 (EP) .................................. 07010231

(51) Int. Cl.
*B02C 25/00* (2006.01)
(52) U.S. Cl. ..... 241/30; 241/100; 241/259.1; 241/261.3
(58) Field of Classification Search .................... 241/30, 241/100, 37, 261.2, 261.3, 259.1
See application file for complete search history.

(56) References Cited

U.S. PATENT DOCUMENTS

| | | | | |
|---|---|---|---|---|
| 1,420,877 A | * | 6/1922 | Sommers et al. | 241/239 |
| 2,229,031 A | * | 1/1941 | Anderson et al. | 241/259.1 |
| 4,060,206 A | * | 11/1977 | Granzow | 241/259.1 |
| 4,685,625 A | * | 8/1987 | Mazza | 241/36 |
| 4,925,150 A | * | 5/1990 | Tedioli | 241/169.1 |
| 2004/0200912 A1 | * | 10/2004 | Park | 241/37 |

FOREIGN PATENT DOCUMENTS

| | | |
|---|---|---|
| DE | 3619126 C1 | 6/1992 |
| EP | 1466547 A | 4/2004 |
| EP | 1525834 A | 4/2005 |

* cited by examiner

*Primary Examiner* — Bena Miller
(74) *Attorney, Agent, or Firm* — Lonnie Drayer

(57) ABSTRACT

A device for the grinding of coffee, for instance in (semi) automatic machines for the preparation and the dispensing of drinks, comprising a housing (11), inside which are positioned at least two milling heads (19, 25) of which at least one (19) is revolving, means (2) of driving said at least one revolving milling head (19), an inlet (32) for feeding the coffee between the milling heads (19, 25) and an exit (35) for the ground coffee. Advantageously, the housing (11) and the milling heads (19, 25) internal to it are coupled to the means of driving (2) through an insert-and-lock joint (12, 13, 18, 218, 20, 120) that allows their rapid removal and reassembly without the aid of tools. Preferably the device includes means of regulating the relative distance between the milling heads and at least one sensor (S) for the measurement of such distance and/or a sensor (S1) of the speed of rotation of the drive shaft.

21 Claims, 6 Drawing Sheets

DEVICE FOR GRINDING COFFEE OR OTHER ALIMENTARY SUBSTANCES

CROSS REFERENCE TO RELATED APPLICATIONS

This is a 371 U.S. National Stage of International Application No. PCT/IB2008/001264, filed May 21, 2008, and published in English as WO 2008/142536 A1 on Nov. 27, 2008 the entire contents of which are incorporated herein by reference, which claims priority of European patent application No. 07010231.4 filed May 23, 2007.

FIELD OF THE INVENTION

The present invention relates to a device for grinding coffee or other alimentary substances, specifically a device to reduce substances such as coffee, barley, flowers, herbs, etc., to a powder to be fed into automatic or semi-automatic machines for the preparation and dispensing of drinks obtained by infusion of such substances.

BACKGROUND OF THE INVENTION

Normally, in (semi)automatic machines dedicated to the preparation of drinks based on coffee, barley, herbs, flowers or other alimentary products available in grain-size not suited to the related brewing process, suitable grinding devices are provided. Such devices, in both domestic and professional situations, include a housing, a pair of milling heads (at least one of which is revolving) located in the housing, motorized device for driving the revolving milling head, a hopper to feed the food substance (for instance, coffee in beans or grains) between the milling heads, a discharge outlet for the ground or pulverized substance, as well as a mechanism to regulate the distance between the milling heads in order to vary the grain-size of the ground substance.

The milling heads are distinguished on the basis of the shape of their edges and, in general they can be plain, (or concave-concave), conical (or concave-convex), rollers, etc. and they can be arranged one inside the other, or vertically one above the other. The concave-convex milling heads are, for instance, usually arranged concentrically, with the convex milling head inside the concave milling head. The plain milling heads are usually arranged concentrically, one above the other.

In the (semi)automatic machine sector, plain or concave-convex milling heads, given their simplicity, are more widely used, while roller milling heads are more widely employed in the industrial sector. In general, the present invention refers to any type of milling head and is not limited to any particular type of milling head.

Traditionally, the known grinding devices of the type suitable for the uses indicated above are made with poorly modular structures that require precision mechanical machining for their construction, with consequent problems of quality and cost.

As is known, the grain-size of the ground coffee is a particularly delicate parameter in the complex of the parameters required for the preparation of a drink based on coffee, particularly in the case of "espresso" coffee. Likewise, the grain-size of the other alimentary substances cited (barley, flowers for herbal teas, etc.) is also important for the organoleptic characteristics of the drinks prepared starting from such ground substances.

The grain-size, once planned and preset, has to remain as constant as possible over time even if the grinding device has to be dismantled and reassembled for maintenance inspections or for cleaning the parts.

Because the value of the grain-size of the ground coffee or the other ground substances depends in large measure on the distance between the milling heads, the dismantling of the grinding device from the driving motor for maintenance or repair, and the consequent subsequent reassembly, constitutes a non-negligible problem in the known art, in as much as it also includes the dismantling of the milling heads with consequent loss of the grain-size setting.

Furthermore, the known grinding devices, made with poorly modular structures, do not allow the dismantling and the subsequent reassembly without the use of tools, such as, for instance screwdrivers, pliers, spanners and similar.

Since dismantling, according to the known art, also involves parts that come into contact with the food, in the present case the milling heads come into contact with the coffee both as beans and as powder, the necessity to resort to using tools to perform the dismantling and subsequent reassembly is also in conflict with the norms that forbid it.

Automatic machines for the preparation and the dispensing of drinks, have recently appeared on the market endowed with devices for the adjustable grinding of coffee to give the desired grain-size of the coffee powder. In such devices, the grain-size of the grains of coffee is regulated by varying the distance between the milling heads.

DISCUSSION OF THE PRIOR ART

For instance, the Italian patent IT 1140758, in the name of Lucio Grossi, describes a grinding device to be installed in automatic machines for the preparation and the dispensing of coffee, that provides for the automatic regulation of the distance between the milling heads based on the difference measured between the real time (duration) of dispensing of the drink prepared with the coffee and a preset sample time. If the real time of dispensing is lower than the sample reference time, the milling heads are brought closer together to reduce the grain-size of the grains of coffee, i.e. to reduce the diameter of the coffee powder. The effect thus obtained with parity of other conditions is to increase the time of dispensing the prepared drinks following the regulation, because the water fed into the brewing chamber of the related machine takes a longer time to go through the "fine" coffee powder. If the real time of dispensing is greater than the sample reference time, the milling heads are separated i.e. their distance is increased, to increase the grain-size of the grains of coffee, i.e. to increase the diameter of the coffee powder. The effect obtained with parity of other conditions is to reduce the time of dispensing of the prepared drinks following the regulation, since the water fed into the brewing chamber of the machine takes less time to go through the "coarse" coffee powder. If the real time of dispensing of the drink is equal, or nearly equal, to the sample reference time, the distance between the milling heads remains unchanged and the grain-size of the ground coffee does not vary. It will be clear to those skilled in the art that, in the grinding device according to the patent IT 1140758, a variation of the grain-size of the coffee, imposed by acting on the distance between the milling heads, has an effect on the characteristics of the drinks prepared after such variation is effected and it does not have any effect on the drink already dispensed.

Disadvantageously, the grinding device according to IT 1140758 and the devices equivalent to it, go out of adjustment easily. Following repeated regulation of the grain-size of the ground coffee, and therefore after the distance between the milling heads has been modified many times beginning from an initial reference position, the device can set the milling heads wrongly or the distance between the milling heads may no longer correspond to that desired when compared to the initial reference distance. In other words, the initial reference distance between milling heads may be lost, and this affects negatively the precision of regulation and the real grain-size obtainable.

A further drawback of the traditional solutions lies in the fact that the known devices are not able to distinguish the absence of grains of coffee or other alimentary substances between the milling heads. In other words, the known devices can't recognize when the substance to be ground is run out (shortage) or when the device, when functioning, doesn't feed any powder substance to the machine for the preparation and the dispensing of drinks prepared by brewing of such powders.

The purpose of the present invention is to make available a device for the grinding of coffee and other alimentary substances that resolves in a simple and effective way the drawbacks of the traditional solutions, while being economical and reliable at the same time.

It is also a purpose of the present invention to make available a device for grinding coffee into powder, beginning from beans or grains, that allows the easy dismantling for the cleaning of the parts, or allows to effect numerous cycles of regulation of the grain-size, without the same device going out of calibration, i.e. without incurring the loss of the positioning between the milling heads and therefore without incurring the loss of the value of grain-size planned for the ground coffee.

It is a further purpose of the present invention to make available a device for the grinding of coffee and other alimentary substances that is simple to assemble and also to dismantle manually without the use of tools. It is a further purpose of the present invention to make available a device for the grinding of coffee and other alimentary substances that provides a feedback control, automatically related to the grain-size of the ground food substance.

These and other purposes of the present invention that relate to a device for the grinding of coffee are met by the appended claims.

In general, the device for the grinding of coffee includes a housing inside which are positioned at least two milling heads that can be of any type known to the art, for instance plain or concave-convex (conical). At least one of the milling heads is operated in rotation around its axis to create a relative rotary movement compared to the fixed milling head, or to the fixed milling heads. The coffee to be ground, coffee in beans of the type commercially available or another food substance to be ground, is fed between the milling heads through a suitable inlet. The ground substance, that is reduced to powder, is fed to a discharging section, for instance to a machine for coffee, through an exit located in correspondence of the milling heads. Advantageously, the housing and the milling heads positioned inside it can be coupled to the means of driving the revolving milling head through a snap-lock joint that allows its removal and reconnection without the aid of tools. With respect to the traditional solutions, the device according to the present invention allows the milling heads and the related housing to be assembled and dismantled quickly to effect the operation of cleaning of the parts or maintenance, without risking contaminating the alimentary substances where present inside, with external tools or equipment.

Another advantage is that the housing can be replaced with great simplicity. For instance, the housing can be an interchangeable type to adapt the device to different machines for the production of drinks.

Those skilled in the art will understand that the device according to the present invention can be used for grinding not only coffee, but also barley, flowers for herbal teas and infusions, cocoa and other alimentary substances that must be fed in powder to external units.

The means of driving comprise a motorized shaft rotating around its own axis and protruding from a support base. The housing of the milling heads is coupled to the support base by a bayonet coupling. In other words, the joint between the housing of the milling heads and the support base is bayonet type, i.e. a male-female angular rotation coupling by complementary forms. This type of joint is used, for instance, in the photographic camera sector for the quick removal and the reattachment of lenses to the camera body, and it allows the housing and its contents to be rapidly locked and unlocked, manually, without the aid of tools, keys, etc., thus preserving the food substance from contact with external tools.

The bayonet coupling between the housing of the milling heads and the support base prevents relative axial and radial movement. Once the operator has inserted and rotated the housing and milling heads on the drive shaft, the housing remains stable in its position.

The revolving milling head, positioned in the housing, fits over the drive shaft and is bound to the same by a slot and a key. Specifically, the joint allows the transmission of the torque from the shaft to the milling head, but it does not prevent axial movement of the same milling head on the shaft. The drive shaft passes through a central hole on the fixed milling head without locking directly to it.

Advantageously, the joining by insertion and locking in the device according to the present invention allows the housing, together with the milling heads, to be managed as if it were a "package" of components fitted via a joint onto the drive shaft of the means of driving, for instance the shaft of a traditional electric motor.

To prevent the disengagement of the housing from the support base, the device comprises furthermore a locking element attachable in a removable way to the free end of the drive shaft. The locking element, lockable manually onto the drive shaft, locks the package formed by the housing and the milling heads to the same drive shaft.

Preferably, the device for the grinding according to the present invention includes means of regulation of the distance between the milling heads, having the function to allow the variation of the grain-size of the ground substance. Such means of regulation can be completely manual, completely automatic, or semiautomatic.

More preferably, such means of regulation are automatic and are commanded by a control unit of the device, or if the device is installed in a machine for coffee, by the control unit of the machine.

The control unit operates the means of regulation of the distance between the milling heads when necessary on the basis of a feedback control related to the grain-size of the ground coffee or the substance ground by the same device.

The device according to the present invention is endowed with at least one sensor that produces a signal indicative of the distance between the fixed and revolving milling heads. The signal furnished by the sensor is sent to the control unit for processing. In other words, the control unit can verify at any moment what the relative distance between the milling heads is, simply by analyzing the signal furnished by the sensor. In general the sensor can be electric, optic, mechanic, magnetic, etc.

The sensor can for instance, include a linear encoder, bound to the housing, that detects the axial stroke (i.e. the movement with respect to the length of the drive shaft) of a milling head with respect to the remaining milling heads. Alternatively, the sensor can be an optic or infrared type, or a Hall effect proximity sensor, able to detect the distance between the milling heads in a remote way. In the case in which the milling heads are located one inside the other, the sensor is set up to measure the distance between the milling heads in the radial direction.

According to a further embodiment of the present invention, alternatively or in addition to the aforesaid sensor, the device also includes a tachometer to count the number of turns per minute (rpm) of the drive shaft. Such tachometer sends a signal to the control unit of the device that provides for its processing. In particular, the control unit compares the detected number of turns of the drive shaft with a pre-selected expected value, and on the basis of such processing it discriminates the presence or not of granules between the milling heads. In other words, the device according to the present invention provides a feedback control on the presence or not, between the milling heads, of grains of coffee or other substances to be ground. Preferably, the control unit compares the value of the number of turns of the drive shaft, corresponding to the signal sent by the tachometer, with one or more reference values related to the number of turns of the drive shaft during an ideal grinding cycle. The differences between the detected value in a given instant and a reference value for the same instant (for instance calculated from the beginning of activation of the drive shaft) are indicative of the quantity of substance to grind present between the milling heads in the device.

For instance, if the quantity of grains of coffee present between the milling heads is lower than that expected, the resistance exerted by the coffee on the milling heads is also lower than that expected and the drive shaft will turn at a greater speed with respect to the reference speed. This situation is indicative of a shortage of coffee. The control unit produces a signal calling for intervention by the operator who can then act to restore the correct quantity of coffee to grind.

If instead the drive shaft rotates at a lower speed than the expected reference speed, the resistance exerted on the milling heads is excessive, a sign that the milling heads may be partly jammed, for instance because of the presence of a foreign body in the housing of the device or because of the presence of hard agglomerations of coffee. The control unit produces an alarm signal.

If the drive shaft rotates at a speed nearly equal to the reference speed, the control unit doesn't intervene to modify the regular operation of the device. According to another embodiment of the present invention, alternatively or in addition to the aforesaid sensor, the device also includes a sensor that detects the time employed by the drive shaft to complete a pre-arranged number of turns in a cycle of activation and it sends a corresponding signal to the control unit. The control unit compares the time employed by the drive shaft to complete the pre-set number of turns with an expected reference value, and on the basis of such processing it discriminates the presence or not between the milling heads of grains of coffee or other substances. For instance, if the time employed by the drive shaft to complete the pre-set 500 turns is smaller than the expected time interval, the control unit interprets this difference as a lack of substance to pulverize between the milling heads and it effects the necessary compensation, acting on other parts of the device or producing an alarm signal. If, instead, the time employed by the drive shaft to complete the pre-set 500 turns is greater than the expected time interval, the control unit interprets this difference as indicative of the presence of an obstruction between the milling heads and it produces an alarm signal. If the time employed by the drive shaft to complete the pre-set 500 turns corresponds to the interval of expected time, the cycle of grinding is regular and the control unit does not intervene to modify the operation of the device. The processing effected by the control unit on the speed of rotation of the drive shaft or on the duration of its activation (time employed to complete a pre-set number of turns) can be used to regulate the grain-size of the substance ground and/or for monitoring one or more operational parameters of the device. The control unit can increase, decrease or maintain constant the time of activation of the device according to the result of the aforesaid processing, so determining or not a change of the grain-size of the treated substance.

In addition or alternatively to the regulation of the distance between the milling heads, the control unit, processing the signal furnished by the aforesaid sensors, can detect possible differences of one or more operational parameters compared to the respective reference values. For instance, the control unit, comparing the values related to the speed of rotation of the drive shaft with reference values, can detect the presence/absence of coffee to grind, the average dose of ground coffee prepared, etc.

Preferably the control unit can be interfaced with the control unit of an external coffee machine. For instance, the device according to the present invention can be of a modular type, installable in the traditional automatic machines for the preparation and the dispensing of drinks. In this way, the control unit of the device according to the present invention can receive and process data inherent to the coffee grain-size ground by the device and used by said machine for the preparation of a drink.

The data acquired and processed by the control unit are selected, for instance, from the brewing time of the coffee powder, the quantity or dose of coffee used, the degree of compactness of the coffee powder, the volume and/or the pressure of brewing water. The feedback control, related to the grain-size of the ground coffee, is operated by the control unit elaborating such data and extrapolating the corresponding values of the grain-size of the coffee used for preparing the drink. The processing is preferably conducted by the control unit of the device comparing the data acquired with reference data, algorithms or charts memorized in a memory of the unit by the constructor.

According to the preferred embodiment of the present invention, the means of regulation of the distance between the milling heads comprises a cylindrical body, coaxial with the housing and engaged with this latter by means of a screw-thread to allow relative axial movement (screwing and unscrewing the two elements produces the relative moves along the common axis, in practice along the axis of the drive shaft). The cylindrical body supports the fixed milling head, while the revolving milling head is fitted to the drive shaft. The cylindrical body is provided with an endless screw mechanism that, when activated by the control unit, transmits its rotation on the screw-thread of engagement with the housing.

The operation of the device is simple. The control unit, when necessary on the basis of the processing of the acquired data and on the basis of the processing of the signal furnished by the sensor, or by the tachometer, operates the endless screw mechanism, transmitting a relative rotation between the cylindrical body that supports the fixed milling head and the housing. The effect obtained is to reduce or to increase (according to the direction of rotation of the activated mechanism) the distance between the fixed milling head and the revolving milling head, modifying therefore in a corresponding way the grain-size of the ground coffee powder.

Preferably, a resilient element is positioned in the housing to safeguard the milling heads, that is to prevent the distance between the same milling heads being excessively reduced and causing mechanical interference between such elements.

The device according to the present invention, besides being simple to produce, assemble and dismantle, is reliable and can be made with components easily found on the market at reasonable cost.

The assembly and the dismantling of the housing and the milling heads in relation to the electric motor is simple and can easily be completed without necessarily using keys or tools, therefore preventing contamination of the internal volume of the same device. This facilitates the cleaning and the maintenance of the device. The dismantling provides for the operator removing the locking element from the free end of the drive shaft and, with a movement first rotational, around the axis of the drive shaft, and then translational along the same axis, unscrews the "package" formed by the housing and the milling heads (and by the cylindrical body and eventually of the other elements present in the housing). The assembly of the whole formed by the housing provides for the engagement of the "package" on the drive shaft and the successive rotation to lock the bayonet attachment. The operator acts to secure such coupling by positioning the locking element on the end of the drive shaft.

The feedback control relating to the grain-size of the powder of ground coffee allows timely intervention to compensate for any possible errors in the grinding, thus maintaining the qualitative standards of the drinks prepared starting from such coffee almost unchanged over time.

Furthermore, the device can easily be installed in the traditional automatic machines for the preparation and the dispensing of drinks. The control unit is predisposed for interfacing with the control unit of the machines for coffee in which the device is installed.

A further advantage compared with the traditional solutions is that the device prevents any possible grinding problems owing to going out of adjustment or incorrect assembly of the parts. In fact, the control unit of the device is able to verify the exact distance between the milling heads at any moment by analyzing the signal furnished by the preceded sensor, and can intervene to compensate for any possible unwanted inaccuracies of relative positioning.

BRIEF DESCRIPTION OF THE DRAWINGS

The invention will now be described in detail with reference to the figures attached which are by way of example and not limiting, in which.

DETAILED DESCRIPTION OF THE INVENTION

Figure 1:
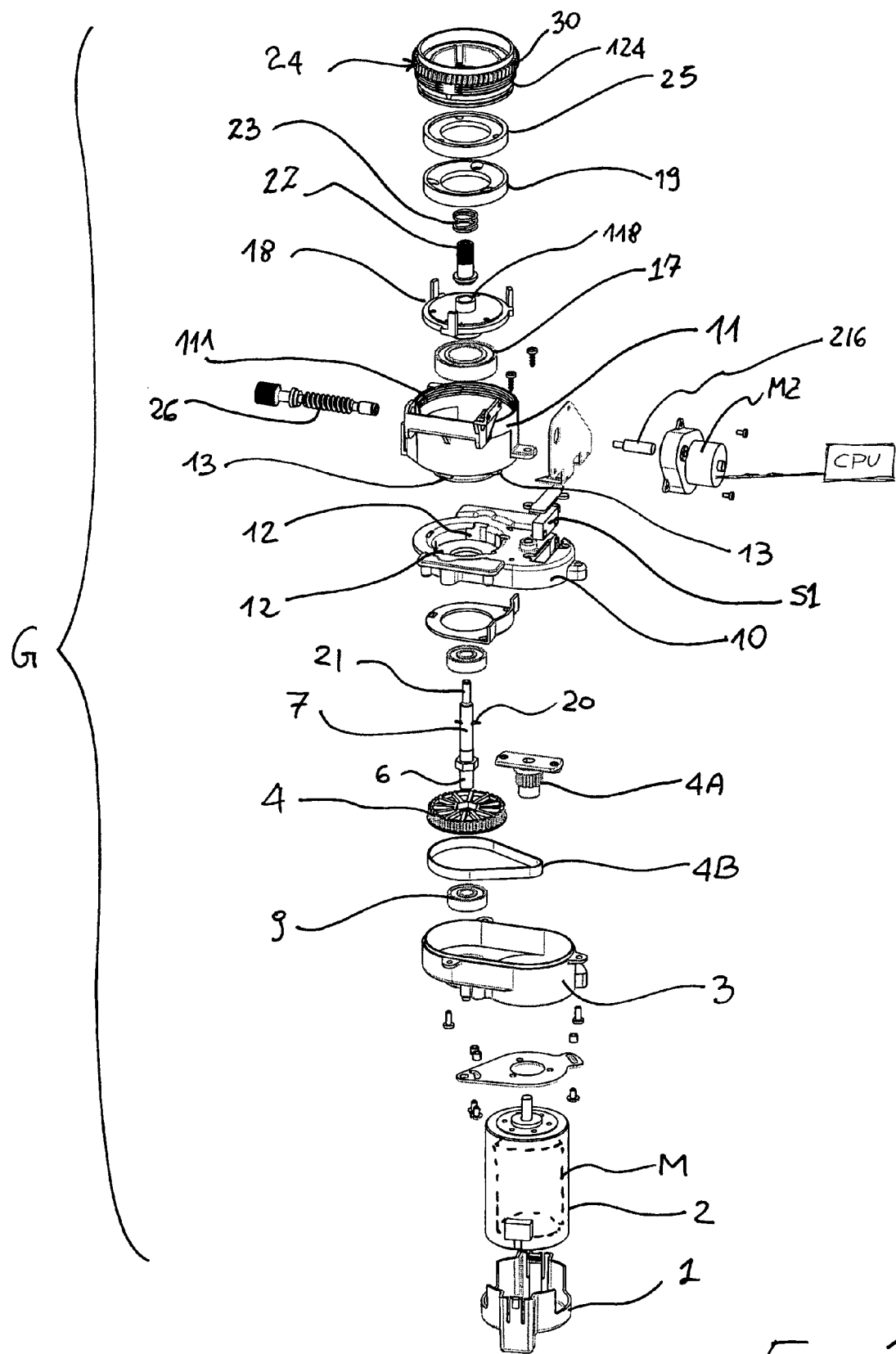
FIG. 1 is an exploded view of a device according to the present invention.

With reference to the FIGS. 1-6, with 1 a plate is indicated on which a hollow column 2 is positioned in whose inside is lodged an electric motor M, for instance, of a conventional type, for driving the grinding device G. The plate 1 allows the anchorage of the device to external surfaces, for instance surfaces of automatic or semiautomatic machines for the preparation and the dispensing of drinks (for instance machines of the type known in the sector by the acronym "HoReCa" that is, hotel-restaurant-café).

To the column 2 is connected a support base 3 inside which is housed the gearwheel 4 that is set in rotation in a known way by the motor M through a pinion 4A and a belt 4B. The support base 3 is closed below by a wall 5 that acts as support for the end 6 of the shaft 7 integral to the gearwheel 4. The shaft 7 is mounted in vertical position and cantilevered from the support base 3 through the hub 8 of the wheel 4, to which it is integral, that is supported on the bearing 9 predisposed on the lower wall 5. Those skilled in the art will understand that the driving shaft 7 can be also the shaft of the motor M, or that the regulator G can be driven directly, without the gearwheel 4 being provided.

The base 3 is closed above by a wall 10 that, besides enclosing wheel 4 in the base 3 functions as support and anchorage of a housing 11 containing the coffee-grinding mechanism and specifically the milling heads.

The housing 11 is connected to the support base 3 by means of a locking joint. According to the preferred embodiment of the present invention, the housing 11 is bound to the support base 3, and specifically to the wall 10 by a bayonet coupling. As shown in FIG. 1 and in FIG. 6, such joint is a male-female type and comprises circular sector 12, set into or bound to 10 and corresponding curved segments on the wall 13, extending from, fixed to or integral with the external wall of the housing 11. Such curved segments 13 extend concentrically from the external wall of the housing 11 and are dedicated to being inserted into the hollow formed by the circular sectors 12 together with the wall 10. The transversal section of the segments 13 and that of the hollow of the sectors 12 are such as to constitute a socket joint between them. Alternatively, the circular sectors 12 can be provided on the housing 11 and the curved segments on the wall 10.

The housing 11 is inserted axially on the drive shaft 7. In other words, the housing 11 is "fitted" onto the shaft 7 with a movement that brings the shaft to insert itself into the housing, along its axis (direction D in FIG. 4). To such end the housing 11 presents a lower central opening 15 through which the drive shaft 7 passes. The same wall 14 also constitutes the base of an axial hollow 16 within which a bearing 17 is positioned that constitutes an axial idler for a grinding-head support 18, in the form of a cup, that constitutes the housing for the lower milling head 19 that, in the case illustrated, is of the conic type (alternatively, it can be a plain milling head).

The milling head 19, of annular shape, is fixed to the base of the grinding-head support 18 by a plurality of screws.

The central part of the grinding-head support 18 is provided with an axial hole 118 through which the drive shaft 7 passes. The axial hole 118 is engaged by a transverse key 20 fixed to the drive shaft 7. When it is engaged with the grinding-head support 18, the key 20 transmits the rotary motion deriving from the drive shaft 7 to the grinding-head support 18 and therefore from this to the milling head 19 that then becomes the revolving milling head.

The upper end 21 of the vertical projecting drive shaft 7 is provided with threading on which a locking element 22 is engaged, for instance a nut having enough resistance to be removed by hand, without needing to resort to tools. There is a resilient element, preferably a coil spring 23 interposed between the locking element 22 and the central part of the grinding-head support 18.

The upper part of the housing 11 that presents a circular cross section, is provided with threading 111 cut into the inside surface. Such threading engages with corresponding threading 124 carried on the external surface of a cylindrical body 24 to whose lower end 224 a static milling head 25 is fixed, for instance by screws. The cylindrical body 24 and the milling head 25 are therefore positioned axially inside the housing 11 with the milling head 25 opposing the milling head 19. It is evident that screwing the cylindrical body 24 more or less with respect to the housing 11 regulates the mutual positioning of the milling heads 25 and 19 and therefore eventually modifies in a corresponding way the grain-size of the ground coffee or the other ground alimentary substances (barley, flowers of camomile, herbs, etc.). Advantageously, the cylindrical body 24 can be made to rotate with respect to the housing 11 through a regulating mechanism comprising an endless screw 26. The endless screw 26 can be operated manually, for instance by the control knob 27 shown in FIG. 4, or can be operated automatically by an electric motor commanded by an electronic type control unit.

In the embodiment shown in the FIGS. 1-6, the endless screw 26 is mounted between two supports 28 carried on a plate 29 fixed to the upper end of the housing 11. The endless screw 26 is engaged with the gear 30 on the external rim of the upper end of the cylindrical body 24. Through such mechanism an elegant and precise regulation of the distance can be obtained between the milling heads 19, 25 and therefore the desired value of grain-size for the coffee treated by the device G.

Figure 2:
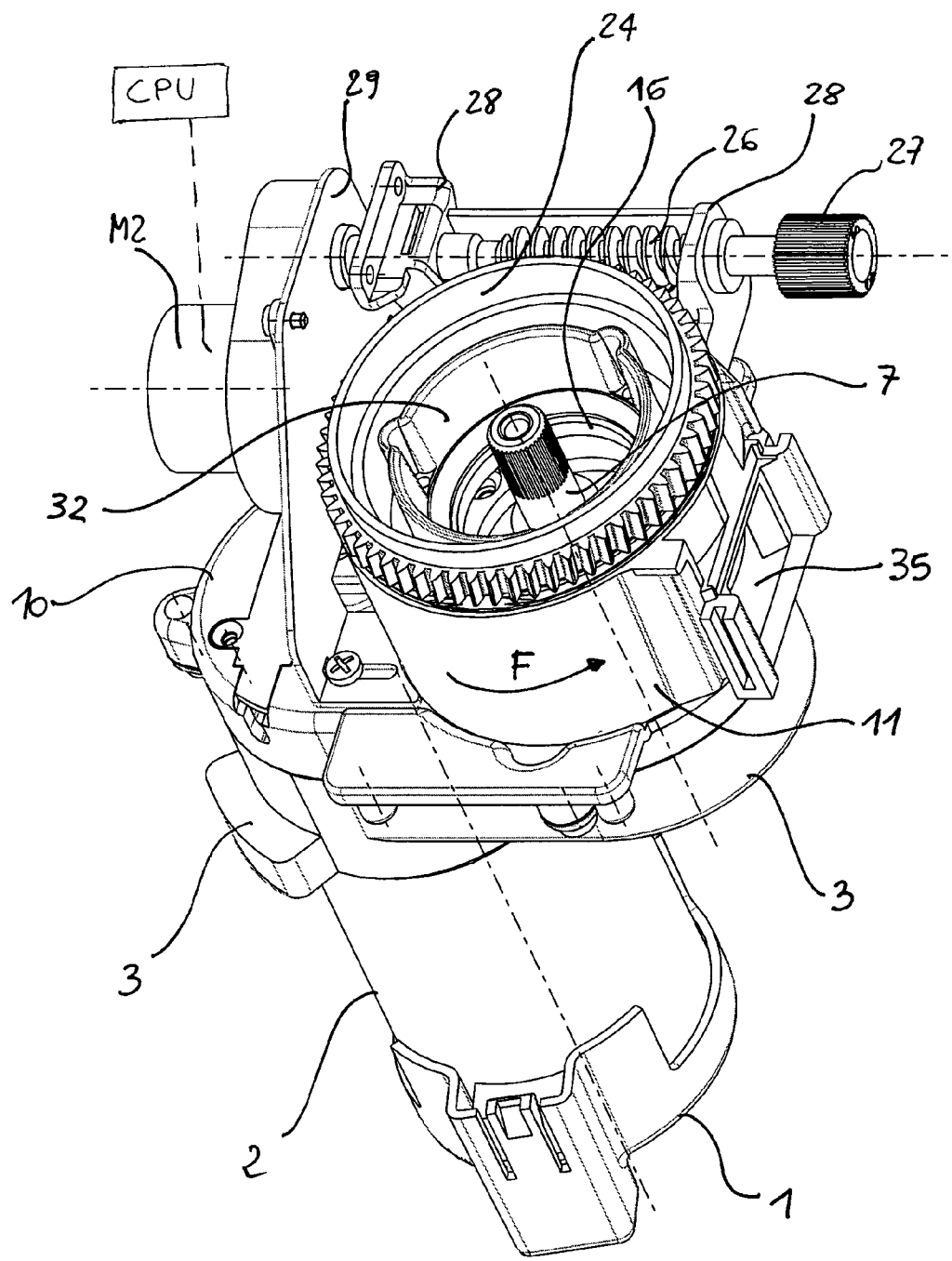
FIG. 2 is a view in perspective, from above, of the device shown in FIG. 1.
Figure 3:
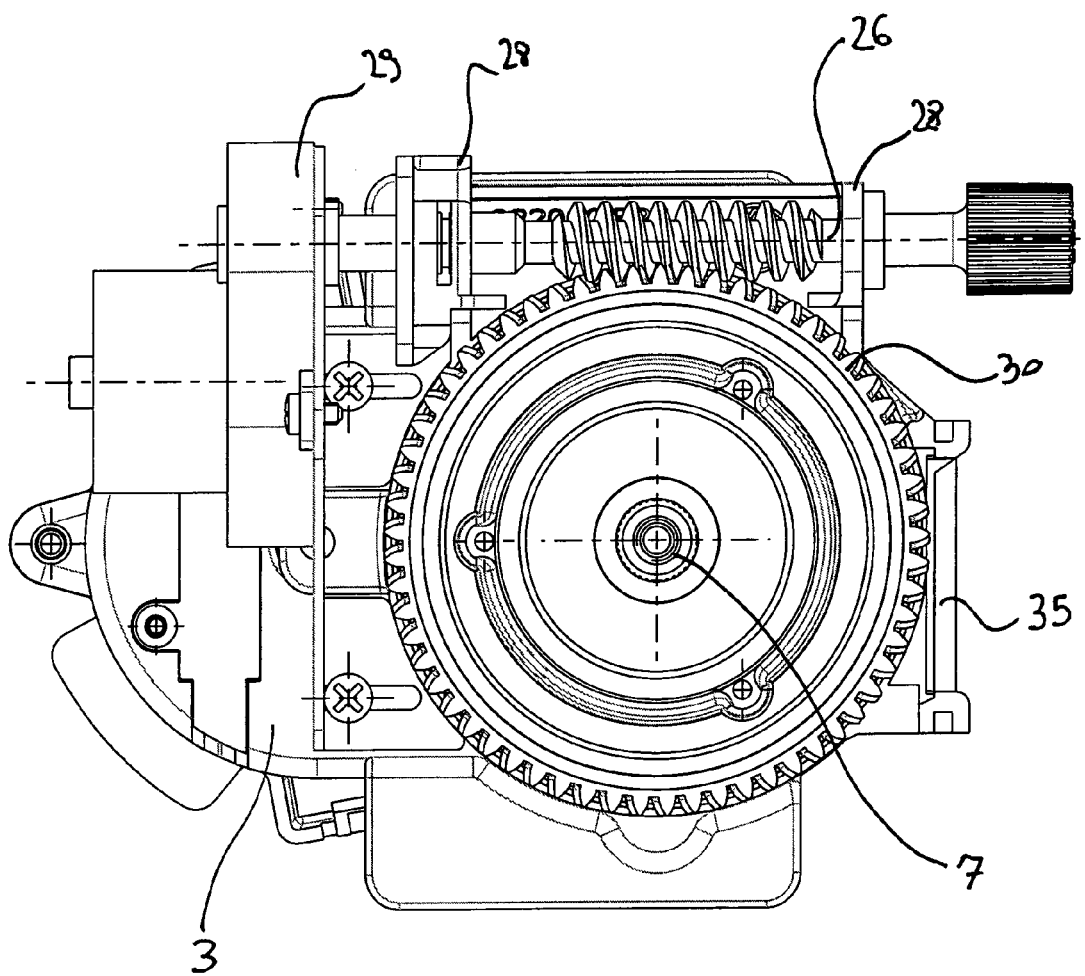
FIG. 3 is a view from above of the device shown in FIG. 1.
Figure 4:
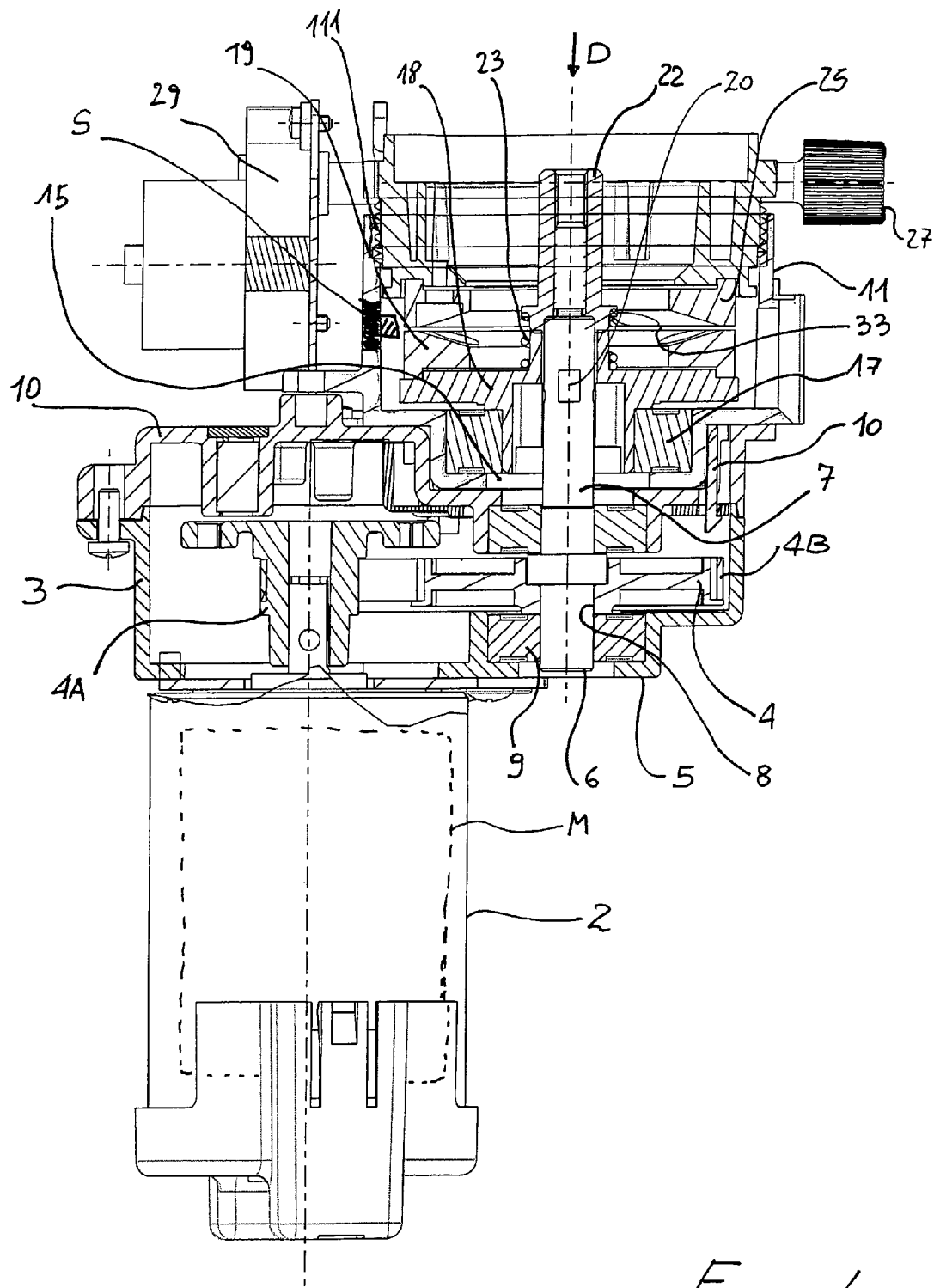
FIG. 4 is a view in longitudinal section of the device shown in FIG. 1.
Figure 5:
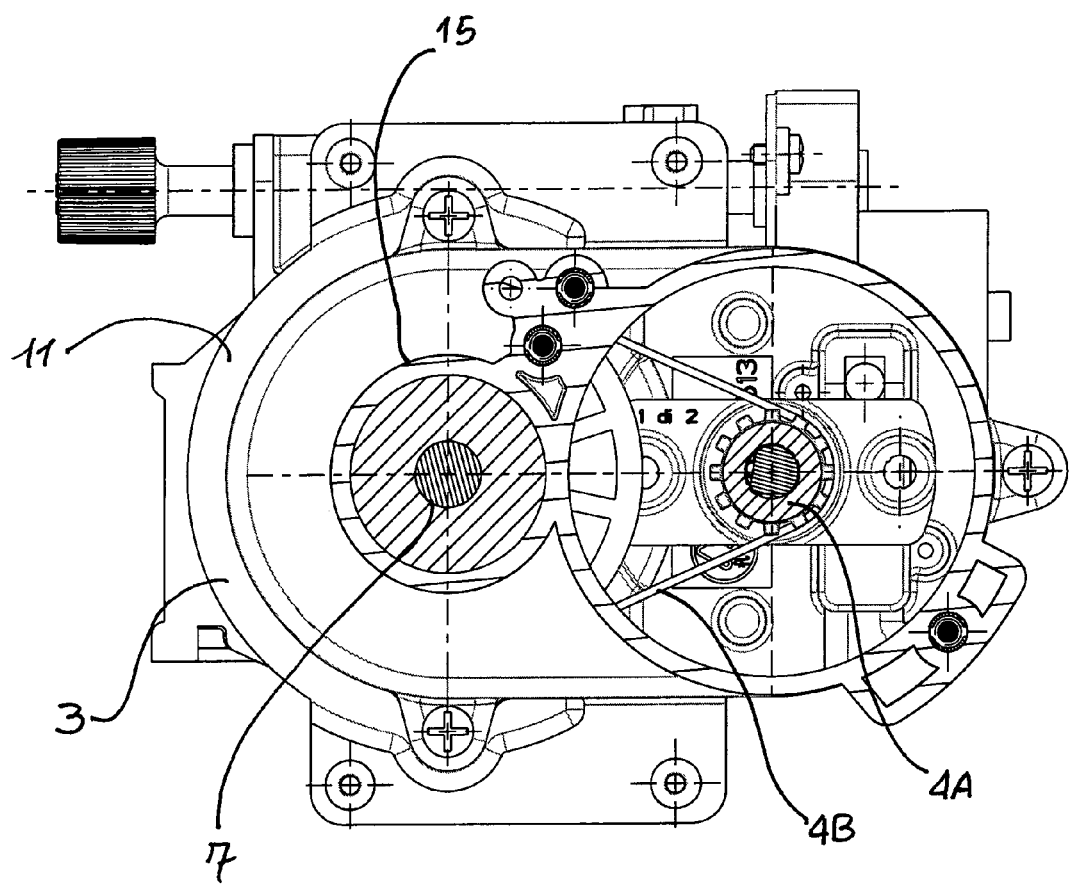
FIG. 5 is a view in transversal section of the device shown in FIG. 1.
Figure 6:
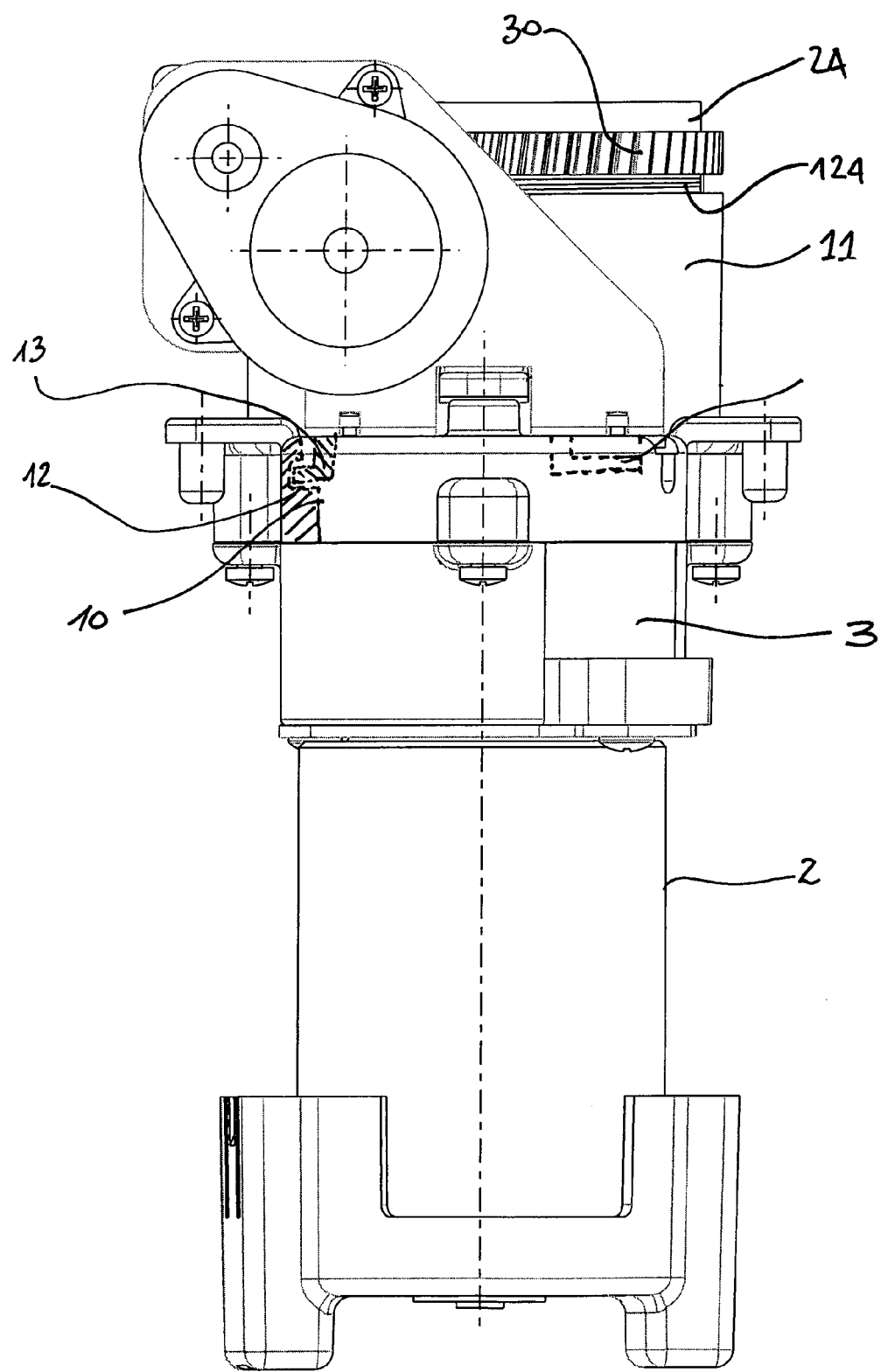
FIG. 6 is a side view of the device shown in FIG. 1.

Preferably, the mechanism to regulate the grain-size of the coffee is driven automatically or semi-automatically and provides for the endless screw 26 being commanded by a CPU control unit, for instance through a shaft and belt drive (in outline in FIG. 2).

The inside part of the cylindrical body 24 include a hopper 31 with an opening 32 on the base for feeding the coffee in beans to the space 33 between the milling heads.

As can be seen in FIG. 2 a discharge outlet 35 for ground coffee is disposed on the side wall of the housing 11.

From what has been described above and with reference to the sketches, it is appreciated that the coffee-grinding regulator G according to the present invention can be removed and detached from the means of driving M, 7 that operate the milling heads 19, 25 by simply unscrewing the nut 22 manually, therefore without tools of any kind, removing the same from the end 21 of the drive shaft 7, removing axially the coil spring 23 located on the same drive shaft 7 and finally rotating the housing 11 as indicated by the arrow F of FIG. 2.

The rotation permits the release of the curved segments 13 from the cavity of the sectors 12 allowing in this way the axial removal of the housing 11. This is made possible because the engagement between the key 20 and the rotating lower grinding-head support 18 is a rotary type alone without axial locking.

It can be appreciated therefore that the mutual positioning of the milling heads 19 and 25 is not altered during the operation of dismantling and therefore the planned value of the grain-size is not lost.

Assembly is achieved by reversing the succession of the operational phases described above and the grain-size is maintained unchanged.

Preferably, the regulator G includes a CPU control unit for the driving of the means of regulation of the distance between the milling heads 19, 25 or the means of regulation of the grain-size.

The CPU control unit operates the endless screw 26, for instance through a motor M2 and a drive shaft 216, to vary the distance between the milling heads 19, 25 when necessary on the basis of the data processed or of previously inserted information on the grain-size of the powder of the ground coffee. In other words, the CPU unit effects a feedback control related to the grain-size of coffee treated by the device G.

The data related to the grain-size of the coffee already ground are extrapolated beginning from the processing of data acquired by external units, for instance data furnished by the machine for coffee in which the regulator G is installed. Such data refer to the preparation of a drink beginning from a dose of coffee ground by the regulator G and they comprise, for instance, the time (duration) of brewing, the pressure and/or the volume of brewing water, the quantity of coffee powder used for the dose, the degree of compactness of the powder in the brewing chamber, etc.

The CPU control unit of the regulator G, acquires the data from the machine for coffee and processes them, comparing the same data for instance with reference values memorized in a special memory location determining the values of the grain-size corresponding to the drink obtained under precise operational conditions.

If necessary, the CPU unit intervenes on the endless screw 26 to vary the distance between the milling heads 19, 25, modifying the grain-size of the ground coffee to compensate for any possible alterations of the other parameters of brewing or to modify the same conditions of brewing to suit the taste of the consumer of the coffee machine.

Preferably, the regulator G includes a sensor S (FIG. 4) predisposed for detecting the relative distance between the revolving milling head 19 and the fixed milling head 25 and for furnishing a signal corresponding to such data to the CPU control unit. Preferably, the sensor S is a Hall-effect sensor. Alternatively or in addition to the sensor S, the regulator G is endowed with a tachometer S1 for the speed of rotation of the drive shaft 7. The tachometer S1 is lodged in the wall 10 (shown schematically in FIG. 1, but not drawn in detail) and it is able to detect the speed of rotation of the shaft 7 at a distance, i.e. remotely.

The tachometer S1 sends an electric signal to the CPU control unit that processes the signal. Specifically, the CPU control unit compares the signal acquired by the sensor S1, and therefore compares the corresponding measured value of the speed of rotation of the shaft 7, with an expected, pre-planned or reference value. The reference value is memorized in the memory of the CPU unit by the constructor of the device 1. Specifically, the CPU unit has memorized numerous reference values, each referred to a time reference datum beginning from the moment of activation of the shaft 7. Such reference values can be established empirically, on the basis of tests of operation of the device G.

The differences between the detected value in a given instant and a reference value for the same instant are indicative of the quantity of food substance to grind present in the device, between the milling heads.

If the quantity of substance, for instance coffee grains, present between the milling heads 19, 25 is lower than that anticipated for the feeding of a dose suited for the infusion of coffee, the resistance exerted by the coffee on the milling heads 19, 25 is also lower than that anticipated and the drive shaft 7 rotates at a higher speed with respect to the reference speed expected. This situation is indicative of a shortage of coffee in the device G. The CPU control unit produces a signal requesting intervention or it commands other mechanisms of supply of the substance to be ground that restore the correct level between the milling heads 19, 25.

If the drive shaft 7 rotates at a lower speed than that of reference, that is a symptom of excessive resistance applied to the milling heads 19, 25 suggesting that the milling heads 19, 25 can be partly jammed, for instance because of the presence of a foreign body in the housing 11 or because of the formation of unwanted agglomerations of the substance to be ground. The CPU control unit produces an alarm signal.

If the drive shaft 7 rotates at the same speed or almost comparable (within a precise limit of uncertainty) to the reference speed, the CPU control unit does not intervene to modify the regular operation of the device G.

The CPU control unit is programmed to regulate the grain-size of the ground substance on the basis of the processing of the signal sent by the tachometer S1. In fact, the CPU unit is able to increase, to decrease or to maintain constant the time of activation of the drive shaft 7 on the basis of the resistance applied to the milling heads 19, 25. In other words, the feedback control related to the presence or not between the milling heads 19, 25 of the food substance to be treated can coincide with a feedback control related to the grain-size of the ground substance. Increasing the time of activation reduces the grain-size and, vice versa, reducing the time of activation the grain-size remains large.

As regards the sensor S, this can be type mechanical, electrical or optical, for instance: infrared, or an encoder, a Hall effect sensor, etc. The CPU control unit acquires the signal from the sensor S and processes it to verify, when necessary, the actual position of the milling heads 19, 25.

According to an embodiment of the present invention, alternatively or in addition to the aforesaid sensor S, the regulator G also includes a sensor T (not shown) that detects the time employed by the drive shaft 7 to complete a pre-arranged number of turns in a cycle of activation, and sends a corresponding signal to the CPU control unit. The CPU control unit compares the time employed by the drive shaft 7 to complete the number of turns pre-arranged, for instance 200, 300 or 500, with a pre-planned reference value, and on the basis of such processing it discriminates the presence or not between the milling heads of grains of coffee or other substances. For instance, if the time employed by the drive shaft 7 to complete the anticipated 300 turns is smaller than the pre-planned time interval, the CPU control unit interprets this difference as indicative of a lack of substance to be pulverized between the milling heads (the drive shaft 7 turn more quickly than expected because of the low resistance met by the milling heads 19, 25 and it finishes its cycle of activation sooner) and it effects the necessary compensations, for instance acting on other parts of the regulator G or producing an alarm signal. If, instead, the time employed by the drive shaft to complete the anticipated 300 turns is greater than the pre-planned time interval, the CPU control unit interprets this difference as indicative of the presence of an obstruction between the milling heads 19, 25 (the drive shaft 7 turns more slowly than expected because of the unexpected resistance applied to the revolving milling head) and it produces an alarm signal. If the time employed by the drive shaft to complete the anticipated 300 turns corresponds to the interval of pre-planned time, the cycle of grinding is regular and the CPU control unit doesn't intervene to modify the operation of the device G.

In general therefore, the CPU control unit, in addition or alternatively to the regulation of the distance between the milling heads, processes the signals in arrival from the sensors S, S1 to detect possible differences in the operational parameters of the device with respect to the corresponding reference values. Examples of operational parameters are the average duration of a grinding cycle, the grain-size of the ground substance, the mass of ground substance, etc.

The CPU control unit is therefore able to reposition the milling heads 19, 25 correctly subsequent to misalignment or going out of adjustment, for instance due to incorrect reassembly or to wear.

The invention claimed is:

1. A device for grinding a substance for use in preparing a drink, comprising a housing, inside which are positioned at least two milling heads of which at least one is revolving, a means of driving said at least one revolving milling head, an inlet for feeding the substance for use in preparing a drink between the milling heads and an exit for the ground substance for use in preparing a drink, wherein said housing and the milling heads internal to it are coupled to said means of driving by an insert-and-lock joint that allows its rapid removal and reassembly without the aid of tools, and a control unit comparing a speed signal of a drive shaft with one or more reference values to detect possible differences of one or more parameters of operation of the device with respect to the respective reference values, said control unit, when necessary on the basis of said comparison, operates a means of regulation of the distance between the milling heads or modifies a duration of the activation of said drive shaft.

2. The device according to claim 1, wherein said insert-and-lock joint comprises a bayonet coupling to bind the housing to a base, preventing relative axial and radial movements, and comprise a joint between said revolving milling head and the drive shaft for the transmission of a rotary motion, allowing axial movements of the revolving milling head with respect to the drive shaft.

3. The device according to claim 2, further comprising a locking element fixable in a detachable way in correspondence of the free end of the drive shaft to secure said insert-and-lock joint.

4. The device according to claim 3, further comprising a spring set between the locking element, positioned on the free end of the shaft, and said revolving milling-head support.

5. The device according to claim 2, wherein said joint between the shaft and the revolving milling head comprises a milling-head support, provided with an axial through-hole with diametrically opposed axial grooves, and a transversal key integral with the drive shaft, said transversal key having a free end inserted in said axial grooves.

6. The device according to claim 2 wherein the substance for use in preparing a drink is coffee and the device further comprises a means of regulation of the distance between the milling heads to vary a grain-size of coffee ground by the device, wherein said control unit operates said means of regulation of the distance between the milling heads, automatically, when necessary on the basis of a feedback control related to the grain-size of the coffee ground by the device, and further comprising at least one sensor that produces a signal indicative of a relative distance between said milling heads, and by said control unit operating said means of regulation of the distance between the milling heads on the basis of processing of the distance signal furnished by said sensor.

7. The device according to claim 1 further comprising an automatic, semi-automatic or manual means of regulation of the distance between the milling heads to vary a grain-size of the substance for use in preparing a drink ground by the device.

8. The device according to claim 7, wherein said control unit operates said means of regulation of the distance between the milling heads, automatically, when necessary on the basis of a feedback control related to the grain-size of the substance for use in preparing a drink ground by the device.

9. The device according to claim 8 further comprising at least one sensor that produces a signal indicative of a relative distance between said milling heads, and by said control unit operating said means of regulation of the distance between the milling heads on the basis of processing of the distance signal furnished by said sensor.

10. The device according to claim 9, wherein the substance ground by the device is coffee and said control unit is interfaced with a coffee brewing machine to receive and to process data inherent to the grain-size of the coffee ground by the device and used by said coffee brewing machine for the preparation of a drink, said data being selected from the brewing time of a coffee powder, the quantity or dose of coffee used, the degree of compactness of the coffee powder, the volume and/or the pressure of a brewing water.

11. The device according to claim 7, wherein said means of regulation of the distance between the milling heads comprises a cylindrical body coaxial with said housing and engaging with the latter by means of a threading to effect relative axial movements, and by said cylindrical body supporting the fixed milling head.

12. The device according to claim 11, wherein said cylindrical body is provided with an endless screw mechanism for its rotation on said threading with which it engages the said housing.

13. The device according to claim 12, wherein said control unit operates said endless screw mechanism to increase or to decrease the distance between the milling heads.

14. The device according to claim 1 further comprising at least one tachometer that produces a signal indicative of a speed of rotation of said drive shaft.

15. The device according to claim 1 wherein the substance for use in preparing a drink is selected from a group consisting of coffee, barley, flowers of camomile, and herbs.

16. A method for grinding a substance for use in preparing a drink comprising the steps of:
providing a device comprising a housing, inside which are positioned at least two milling heads of which at least one revolves, a means of driving said revolvable milling head and including a drive shaft activated in rotation around its own axis which projects from a support base, an inlet for feeding the substance for use in preparing a drink between the milling heads and an exit for a ground substance for use in preparing a drink;
supplying a substance for use in preparing a drink to a hopper via an inlet of the device and feeding the substance for use in preparing a drink to a the space between the milling heads; and
activating the milling heads and a control unit of the device, wherein the control unit compares a speed signal of said drive shaft with one or more reference values to detect possible differences of one or more parameters of operation of the device with respect to the respective reference values, said control unit, when necessary on the basis of said comparison, operates a means of regulation of a distance between the milling heads or modifies a duration of an activation of said drive shaft.

17. The method according to claim 16, wherein the distance between the milling heads varies a grain size of the substance for use in preparing a drink ground by the device and is regulated automatically by said control unit that operates said means of regulation, when necessary, on the basis of a feedback control related to the grain-size of the substance for use in preparing a drink ground by the device.

18. The method according to claim 16, wherein said control unit operates said means of regulation of the distance between the milling heads on the basis of processing of a distance signal furnished by at least one that produces a signal indicative of the relative distance between said milling heads.

19. The method according to claim 16, wherein the substance for use in preparing a drink is coffee and said control unit is interfaced with a coffee brewing machine to receive and to process data relating to a grain-size of coffee ground by the device and used by said coffee brewing machine for the preparation of a drink, said data being selected from the brewing time of a coffee powder, the quantity or dose of coffee used, the degree of compactness of the coffee powder, the volume and/or the pressure of a brewing water.

20. The method according to claim 16, wherein said means of regulation of the distance between the milling heads comprise a cylindrical body coaxial with said housing and engaging with the latter by means of a threading to effect relative axial movements, wherein said cylindrical body supports a fixed milling head and is provided with an endless screw mechanism for its rotation on said threading with which it engages said housing, and wherein said control unit operates said endless screw mechanism to increase or to decrease the distance between the fixed milling head and the revolving milling head.

21. The method according to claim 16 wherein the substance for use in preparing a drink is selected from a group consisting of coffee, barley, flowers of camomile, and herbs.

* * * * *